United States Patent
Kelp

(10) Patent No.: US 8,946,947 B2
(45) Date of Patent: Feb. 3, 2015

(54) ELECTROMAGNETIC LINEAR STEPPER MOTOR

(75) Inventor: Martin Kelp, Berlin (DE)

(73) Assignee: Karl Storz GmbH & Co. KG (DE)

( * ) Notice: Subject to any disclaimer, the term of this patent is extended or adjusted under 35 U.S.C. 154(b) by 723 days.

(21) Appl. No.: 13/045,290

(22) Filed: Mar. 10, 2011

(65) Prior Publication Data

US 2011/0221379 A1    Sep. 15, 2011

(30) Foreign Application Priority Data

Mar. 10, 2010    (DE) .................. 10 2010 015 905

(51) Int. Cl.
| | |
|---|---|
| *H02K 41/03* | (2006.01) |
| *H02K 37/00* | (2006.01) |
| *H02K 41/035* | (2006.01) |
| *H02P 8/00* | (2006.01) |
| *H02K 1/27* | (2006.01) |
| *H02K 7/08* | (2006.01) |
| *H02K 7/14* | (2006.01) |

(52) U.S. Cl.
CPC .......... *H02K 41/031* (2013.01); *H02K 41/0356* (2013.01); *H02P 8/005* (2013.01); *H02K 1/2713* (2013.01); *H02K 7/08* (2013.01); *H02K 7/14* (2013.01)
USPC .............. 310/12.17; 310/23; 310/30; 310/36; 310/14; 310/34

(58) Field of Classification Search
CPC ..................................... H02K 41/03
USPC .................... 310/12.17, 23, 30, 36, 34, 14
See application file for complete search history.

(56) References Cited

U.S. PATENT DOCUMENTS

| | | | | |
|---|---|---|---|---|
| 3,894,275 | A | * | 7/1975 | Baumans et al. ................ 318/38 |
| 3,917,394 | A | * | 11/1975 | Sturdevant ..................... 353/101 |
| 4,198,582 | A | * | 4/1980 | Matthias et al. ........... 310/12.17 |
| 4,446,412 | A | * | 5/1984 | Friedman et al. ............. 318/696 |
| 4,684,262 | A | * | 8/1987 | Meister ......................... 368/157 |
| 5,478,650 | A | | 12/1995 | Davanloo et al. |
| 6,013,959 | A | | 1/2000 | Hoppie |
| 6,787,931 | B2 | * | 9/2004 | Nakagawa et al. ............. 290/31 |
| 7,365,768 | B1 | | 4/2008 | Ono et al. |

(Continued)

FOREIGN PATENT DOCUMENTS

| | | |
|---|---|---|
| DE | 2621272 A1 | 11/1976 |
| DE | 3717872 A1 | 12/1988 |
| DE | 19618355 A1 | 11/1997 |

(Continued)

*Primary Examiner* — Terrance Kenerly
(74) *Attorney, Agent, or Firm* — St. Onge Steward Johnston & Reens LLC

(57) ABSTRACT

A linear stepper motor is used for the displacement of an armature parallel to a stator having N steps. The stator includes (N+2) stator pole pieces which are enclosed by a magnetic guiding element and are each approximately the same distance from neighboring stator pole pieces. Furthermore, at least one coil is located between two stator pole pieces. The armature is enclosed by the stator in the radial direction and has a permanent magnet magnetized parallel to the stator which is disposed between two armature pole pieces. As a result of the reluctance forces, the armature occupies stable idle positions inside the stator in which the stator pole pieces lie opposite the armature pole pieces. By energizing the coils with a short current pulse, the armature can be displaced inside the stator between the different stable idle positions.

14 Claims, 8 Drawing Sheets

(56) References Cited

U.S. PATENT DOCUMENTS

| | | | |
|---|---|---|---|
| 2004/0056530 A1* | 3/2004 | Yuda et al. | 303/DIG. 11 |
| 2005/0023905 A1* | 2/2005 | Sakamoto | 310/12 |
| 2006/0055360 A1 | 3/2006 | Reiter et al. | |
| 2006/0226713 A1* | 10/2006 | Lehr et al. | 310/12 |
| 2009/0243402 A1* | 10/2009 | O'Day et al. | 310/12.19 |

FOREIGN PATENT DOCUMENTS

| | | |
|---|---|---|
| DE | 10105787 A1 | 2/2002 |
| DE | 10323629 A1 | 10/2004 |
| DE | 102008038926 A1 | 2/2009 |
| JP | 2008193760 A | 8/2008 |
| WO | 2007141075 A1 | 12/2007 |

* cited by examiner

ELECTROMAGNETIC LINEAR STEPPER MOTOR

CROSS-REFERENCE TO RELATED APPLICATIONS

The present application claims priority of German patent application No. 10 2010 015 905.0 filed on Mar. 10, 2010, the content of which is incorporated herein by reference.

FIELD OF THE INVENTION

The invention relates to a linear stepper motor in particular for optical systems. Such optical systems are used, for example, in endoscopes. In modern video endoscopes a camera chip and an appurtenant lens system are integrated in the endoscope tip. A miniaturized motor is required to adjust the focal length or the focus of the lens system.

BACKGROUND OF THE INVENTION

Classical endoscopes such as can be used, for example, for minimally invasive surgery, guide the image by means of rod lenses from the intracorporeal objective to the extracorporeal eyepiece. As a result of the rod lenses, the system is rigid and limited in optical quality. Modern video endoscopes use a camera chip in the endoscope tip. Such an endoscope is disclosed in U.S. Pat. No. 7,365,768 B1. This has a rigidly disposed lens in front of the camera chip. An adjustment of the focal length of the lens is not possible.

DE 196 18 355 C2 discloses a linear drive which can be integrated in endoscopes for adjusting the focal width of a lens system. For this purpose a permanent magnet is moved as an armature inside a stator coil. The linear drive requires current flow to remain at a specific position. The relationship between the coil current and the armature position is not single-valued and necessitates an additional displacement sensor with positional regulation. The travel path of the armature is determined by the length of the magnetic system. In order to achieve long distances, a corresponding magnetic length of the armature and twice as long solenoid coils are required.

DE 37 17 872 C2 discloses a drive having an armature and a stator for a lens system in video cameras. The armature consists of two iron sleeves which are interconnected by a support for receiving the lens system. The stator has two coils and a single annular permanent magnet for generating the magnetic fields required for the movement between the coils. The complex structure of the drive can be readily implemented in video cameras having lens diameters in the centimeter range but is not scalable to the size required for endoscope applications in the millimeter range.

DE 103 23 629 A1 discloses a moving field linear motor which includes at least three stator coils. A phase-shifted current supply to the coils produces a moving field which effects a displacement of the armature with axial permanent magnets. An expensive controlling circuit is required to produce the moving field.

Known from DE 10 2008 038 926 A1 is a linear drive including two axially polarized permanent magnets in the armature. The armature has one stable position from which it is deflected by the current supply to the stator coils in the axial direction.

SUMMARY OF THE INVENTION

The embodiments are based on the object of providing a linear motor having such small dimensions that it can be inserted into endoscopes. Furthermore, the linear motor should enable a defined positioning without additional position sensors. In addition, the linear motor should exhibit large driving forces with small mass and thereby render possible a rapid, continuous and exact positioning of optical components in the largest possible range. At the same time, the beam path through the optical components must not be blocked during displacement of the components. The power loss of the linear motor should be low so that little heat is produced in the tip of an endoscope. The drive should be composed of as few as possible and as geometrically simple as possible individual components for simple manufacture and assembly.

In an embodiment the linear stepper motor includes a stator and an armature which is linearly displaceable thereto. In a currentless state, the armature can occupy N stable positions corresponding to N steps. The armature is completely enclosed by the stator in the radial direction and has at least one permanent magnet with armature pole pieces on each side of the permanent magnet. The armature is therefore always shorter than the stator and moves inside the stator. The stator has at least (N+2), preferably precisely (N+2) stator pole pieces which are disposed in approximately equal distances. The stator pole pieces are enclosed by a magnetic guiding element. Furthermore at least one coil is disposed between two stator pole pieces. As a result of the reluctance forces, the armature occupies stable idle positions inside the stator in which preferably the stator pole pieces lie approximately opposite to the armature pole pieces. By energizing the at least one coil, the armature can be displaced inside the stator between the different stable idle positions. A short current pulse typically in the range of some few milliseconds is sufficient for the displacement. The current direction in that coil or coils adjacent to which or in which the permanent magnet is specifically located is relevant for the movement. Depending on the current direction, the movable armature can be attracted or repelled.

In a particularly advantageous embodiment 1, 2 or 3 stator pole pieces lie between two coils.

A further embodiment has a rotationally symmetrical armature and/or a rotationally symmetrical stator. The linear motor is preferably designed rotationally symmetrically with annular magnetic guiding element, pole pieces, permanent magnets and annular coils (ring coils). The armature and in particular the permanent magnets as well as the pole piece are preferably hollow-cylindrical, i.e. they have the form of a cylindrical sleeve. The beam path of an optical system can then run through the sleeve. In particular, a lens or another optical element can sit in the sleeve. Consequently, the focal length and/or the focus of the optical system can be adjusted by a displacement of the sleeve.

The linear motor enables an exact adjustment of the position of the armature relative to the stator between two end positions. The individual components have a simple geometry (rings, sleeves) and therefore can easily be manufactured and assembled.

The pole piece and the magnetic guiding element must always include ferromagnetic and/or soft magnetic materials.

The linear motor can easily be miniaturized as far as a size of a few millimeters external diameter. In a motor having an external diameter of a few millimeters, the travel distance between the two end positions of the armature is typically about 1 to 3 mm.

The coils can optionally be wound onto a coil form or without a coil form as desired. They can also be multi-part, i.e. they can consist of a plurality of windings.

In a further advantageous embodiment, there is a sliding layer between the stator and the armature. This can be implemented as a sliding sleeve in particular in the case of a rotationally symmetrical arrangement.

In an alternative embodiment, the linear motor described can be implemented with a flat stator, e.g. having a plate-shaped structure and likewise flat or plate-shaped pole pieces of the armature. Alternatively, a plurality of linear motors disposed around a cylinder or a polygonal body can also be provided. A stable guidance is obtained, for example, in the case of a uniform arrangement of linear motors around a cylinder.

In another embodiment the linear motor can also consist of solid material and have a plunger at one end for the positioning of instruments. Such a device can preferably be used in molecular biology, microelectronics or neurosurgery. A positioning of large components such as valves is also possible.

It is particularly favorable if the coils are supplied with a direct current pulse with a superposed alternating current of small amplitude and having a frequency up to a maximum of 1 kHz. The static and sliding friction can be reduced by this means.

In a method for operating a linear motor, at least one of the coils is energized over a longer time, i.e. supplied with current, in order to increase the stiffness and therefore the retaining force in the event of a deflection from a stable idle position.

A further embodiment relates to a method for operating a linear motor, wherein the linear motor is supplied with a pulse of direct current and a superposed alternating current of small amplitude and having a frequency up to a maximum of 1 kHz. The static friction or sliding friction in the interior of the motor can be reduced by this means.

A further aspect relates to a method for calibrating the positions. After switching on the stepper motor, a calibration is performed in which the armature is displaced to a defined position, preferably an end position.

The stator can be arbitrarily lengthened by further magnetic coils, soft iron rings and spacers. By this means the number of steps and thereby the travel distance of the armature can be made arbitrarily long. This has the advantage that the armature of the present drive can cover arbitrary travel paths, with the result that a plurality of applications for the actuator becomes possible. Actuating tasks of all kinds can be carried out with the electromagnetic linear stepper motor. A major field of application is, for example, the field of endoscopy. Current developments provide a linear movement of optical components inside the endoscope shaft. This includes, for example, the movement of lenses, lens groups, apertures or even image sensors of the optical system. Furthermore, the present drive can be used for closure devices of all kinds. This includes, for example, the movement of a plunger for valves or a closing bolt for locks.

Depending on the application, the present drive can be miniaturized or enlarged. In this case, the design can be arbitrarily adapted in order to ensure the necessary retaining forces, travel distances and the number of stable positions.

As a result of the high stiffness which prevails at the stable armature positions determined by the system, a high positioning accuracy is obtained. The armature's positions are thereby approached highly accurately even under influences such as friction or gravitational acceleration.

A major advantage of the linear stepper motor is the low energy consumption. A short current pulse is only necessary during the movement of the armature. During the residence of the armature in a stable position, no current flow is necessary. The permanent-magnet armature is held in the stable position by the reluctance force. Depending on the magnet material and magnet volume of the permanent magnets used, the stiffness and therefore the positioning accuracy of the present drive can be increased. The position accuracy of the armature is not dependent on the current intensity in the coils but on the magnitude of the magnetic flux in the magnetic circuit of the permanent magnet. In spite of this, it is possible to maintain magnetic fields in the coils by permanent energizing, which additionally increases the stiffness of the drives.

Compared with spindle drives, all the advantages of linear direct drives come to bear in the present drive. Primarily the high dynamics of the linear step motor described is worth noting. The armature reaches its desired position after a time of a few milliseconds. The friction produced, the wear and the work to be applied in direct drives are much lower than in drives in which a rotational movement is converted into a translational movement. Crucial advantages with regard to manufacture also exist here. All the components used for the drive described are rotationally symmetric and easy to manufacture.

BRIEF DESCRIPTION OF THE DRAWINGS

In the following, the invention will be described by way of example, without limitation of the general inventive concept, on examples of embodiment and with reference to the drawings.

DETAILED DESCRIPTION OF THE INVENTION

Figure 1:
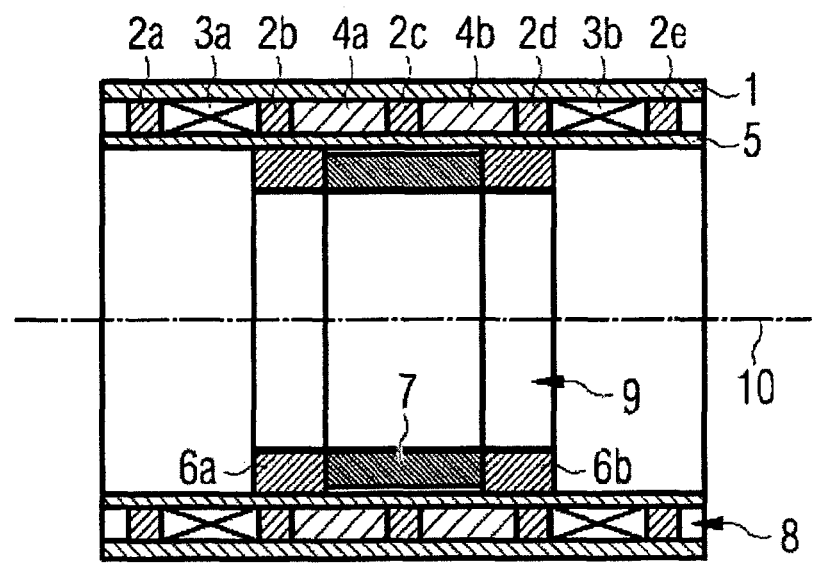
FIG. 1 shows schematically a stepper motor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

FIG. 1 shows schematically a sectional view of an exemplary embodiment in cylindrical design for N=3 stable positions. The stator 8 includes a magnetic guiding element 1 in the form of a soft-magnetic guiding tube, the (N+2)=5 stator pole pieces 2a-2e made of soft-magnetic material being disposed in the bore whereof at fixed uniform distances. The coils 3a, 3b and the non-magnetic spacers 4a, 4b are located between the stator pole pieces. The distance between two stator pole pieces corresponds to the length of a coil. A sliding layer 5 in the form of a sliding sleeve terminates the stator 8 here towards the inside and provides a low-friction surface for the armature 9. The sliding sleeve must consist of a non-ferromagnetic material. The armature 9 here includes a permanent magnet 7 magnetized in the direction of the central axis 10, which is designed as a ring magnet. The armature pole pieces 6a, 6b are disposed on the two front sides corresponding to the poles of the permanent magnet. The distance of the armature pole pieces from one another corresponds to the length of the permanent magnet. The armature is axially displaceable in both directions inside the sliding sleeve. The armature pole pieces 6a, 6b are located opposite the stator pole pieces 2b, 2d in the idle position shown. As a result of the reluctance force, a stable position of the armature is obtained as shown. In a currentless state, the armature can occupy N=3 stable positions corresponding to N steps. Each pair of two adjacent stator pole pieces are approximately the same distance apart from one another. Optionally the distances between two stator pole pieces differ by 10%, preferably by 5% from the other distances between pole pieces. The distance between two armature pole pieces is preferably greater than or equal to the distance between Z stator pole pieces. In this context, the number Z is an integer greater than or equal to 2. In the shown embodiment Z equals to 2.

Particularly preferably, the distance between two armature pole pieces is greater than or equal to the distance between Z stator pole pieces plus the length of the stator pole piece in the axial direction. Alternatively, the distance between two armature pole pieces can correspond to the distance between Z stator pole pieces. Optionally, the distance between two armature pole pieces can differ by 10%, preferably by 5% from the distance between Z stator pole pieces. As shown, the stator pole pieces are enclosed by a magnetic guiding element. Furthermore at least one coil is disposed between two stator pole pieces.

As a result of the reluctance forces, the armature occupies stable idle positions inside the stator in which preferably the stator pole pieces lie approximately opposite to the armature pole pieces. By energizing the at least one coil, the armature can be displaced inside the stator between the different stable idle positions. A short current pulse typically in the range of some few milliseconds is sufficient for the displacement. The current direction in that coil or coils adjacent to which or in which the permanent magnet is specifically located is relevant for the movement. Depending on the current direction, the movable armature can be attracted or repelled. As a result of the previously described dimensioning of the distance between the armature pole pieces, it is achieved that at least in a certain range during the displacement between two stable idle positions, the armature pole pieces do not lie opposite any stator pole pieces. Additional coils can be energized to increase the stiffness.

The coils can optionally be wound onto a coil form or without a coil form as desired. They can also be multi-part, i.e. they can consist of a plurality of windings.

In order to influence the magnetic fields as little as possible, the sliding layer should consist of a non-magnetic-field-conducting material, in particular of a non-ferromagnetic material. The surface thereof preferably includes a material having a low coefficient of friction, for example, PTFE (polytetrafluorethylene), silicon nitride, silicon carbide, poly-para-xylylene polymers or DLC (diamond like carbon) such as is disclosed, for example, in U.S. Pat. No. 5,478,650. The surface can also be polished in order to further reduce the friction. The sliding layer can compensate for unevennesses on the side of the stator facing the armature.

An element to be positioned, such as an optical component, can be inserted into the bore of the armature. The central axis 10 is also the axis of rotation in arrangements having a rotationally symmetrical structure.

The linear motor can easily be miniaturized as far as a size of a few millimeters external diameter. In a motor having an external diameter of a few millimeters, the travel distance between the two end positions of the armature is typically about 1 to 3 mm.

In an alternative embodiment, the linear motor described can be implemented with a flat stator, e.g. having a plate-shaped structure and likewise flat or plate-shaped pole pieces of the armature. Alternatively, a plurality of linear motors disposed around a cylinder or a polygonal body can also be provided. A stable guidance is obtained, for example, in the case of a uniform arrangement of linear motors around a cylinder.

In another embodiment the linear motor can also consist of solid material and have a plunger at one end for the positioning of instruments. Such a device can preferably be used in molecular biology, microelectronics or neurosurgery. A positioning of large components such as valves is also possible.

It is particularly favorable if the coils are supplied with a direct current pulse with a superposed alternating current of small amplitude and having a frequency up to a maximum of 1 kHz. The static and sliding friction can be reduced by this means.

Figure 2:
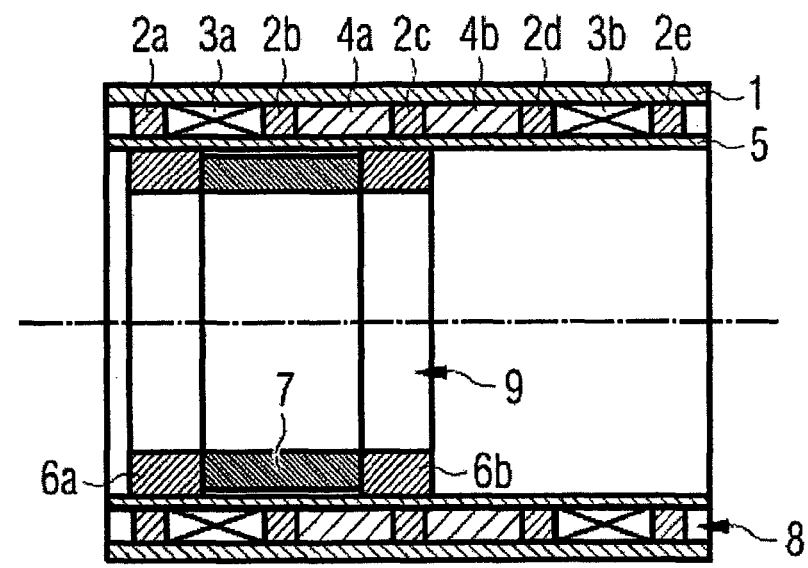
FIG. 2 shows the stepper motor with a different armature position.

FIG. 2 shows the stepper motor from FIG. 1 with a different armature position. Here also a stable position of the armature is obtained as a result of the reluctance force. In the idle position shown the armature pole pieces 6a, 6b are located opposite the stator pole pieces 2a, 2c.

Figure 3:
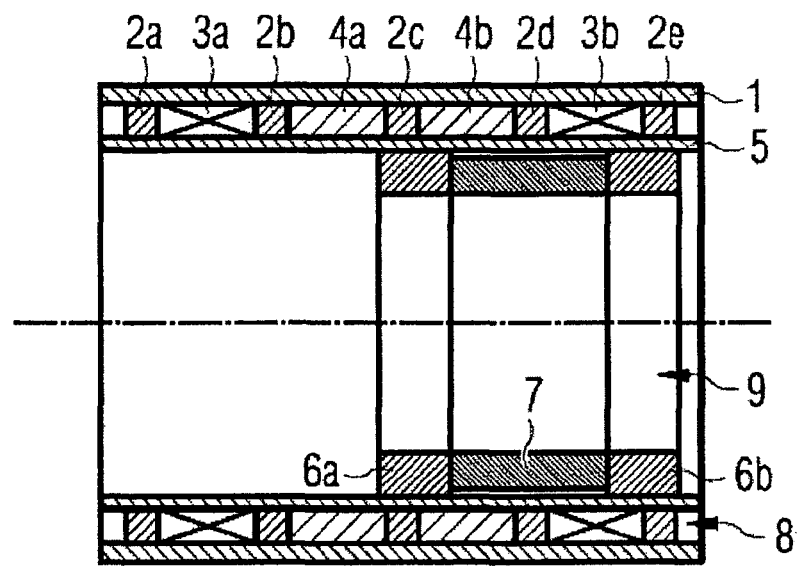
FIG. 3 shows the stepper motor with a further armature position.

FIG. 3 shows the stepper motor from FIG. 1 with a further armature position. Here also a stable position of the armature is obtained as a result of the reluctance force. In the idle position shown the armature pole pieces 6a, 6b are located opposite the stator pole pieces 2c, 2e.

Figure 4:
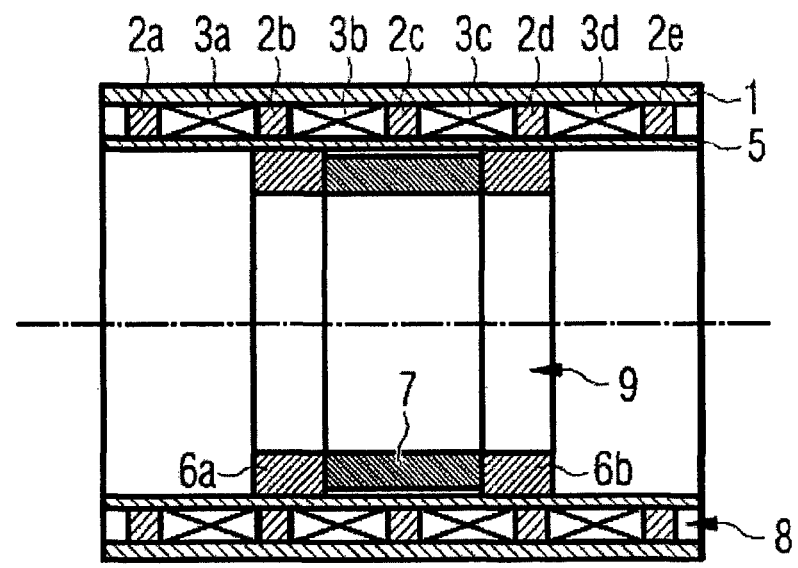
FIG. 4 shows a stepper motor with four coils.

FIG. 4 shows a stepper motor having four coils 3a-3d. Here, instead of the spacers, coils are provided in the stator. As a result, a more uniform action of force on the armature is achieved.

Figure 5:
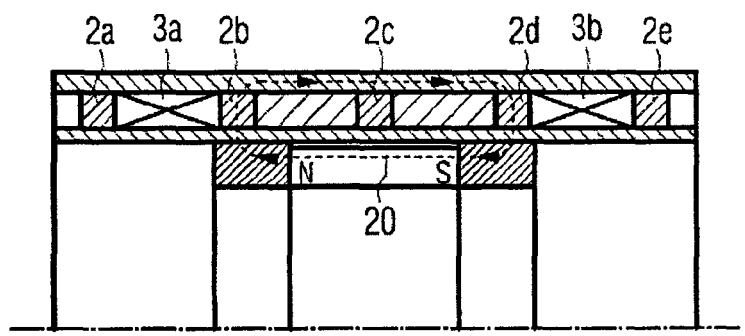
FIG. 5 shows the magnetic flux in a first position without energizing.

FIG. 5 shows the magnetic flux in a first position without energizing. Here the armature pole pieces 6a and 6b are located opposite the stator pole pieces 2b and 2d. In this position the magnetic resistance (reluctance) of the magnetic circuit is very low. The magnetic field is closed from the north pole N via the armature pole piece 6a and the stator pole piece 2b via the magnetic guiding element 1 to the stator pole piece 2d and the armature pole piece 6b with the south pole S of the permanent magnet 7. The armature is located here in a stable equilibrium. If an external force, for example, gravity or inertial forces, act on the armature, the reluctance is increased since the air gap becomes larger, and a reluctance force counteracting the movement is thereby produced.

Figure 6:
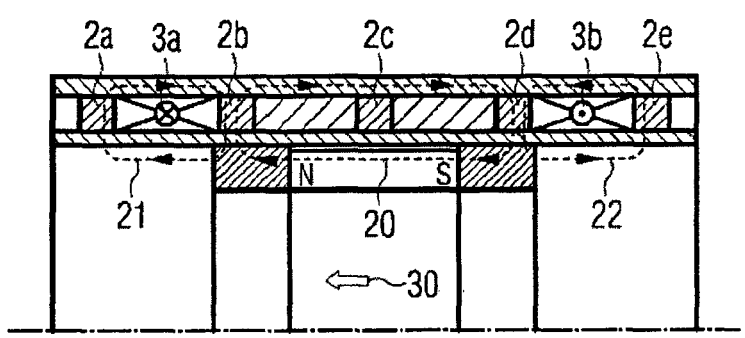
FIG. 6 shows the magnetic flux in a first position with energizing.

FIG. 6 shows the magnetic flux in a first position according to FIG. 5 but with energizing. The coils located on the armature are supplied by short current pulses to move the armature. The current pulses produce magnetic fields 21, 22 in the coils which act via the stator pole pieces and the armature pole pieces on the permanent magnets and are superposed on the magnetic field 20 of the permanent magnet. Energizing of the two coils 3a and 3b is shown here. The current flows through the coil 3a into the plane of the drawing here and produces a magnetic field 21 whereas the current through the coil 3b flows out from the plane of the drawing and produces a magnetic field 22. As a result, the stable position of the armature is cancelled during the energizing and reluctance forces are produced which force the permanent magnet and therefore the armature into the desired direction 30. The armature can move to the left or the right depending on the direction of the electric current in the coils. For a movement of the armature from one stable position to a neighboured stable position one current pulse per coil is sufficient. A movement to the left is shown in the sequence of FIG. 6 to FIG. 7.

Figure 7:
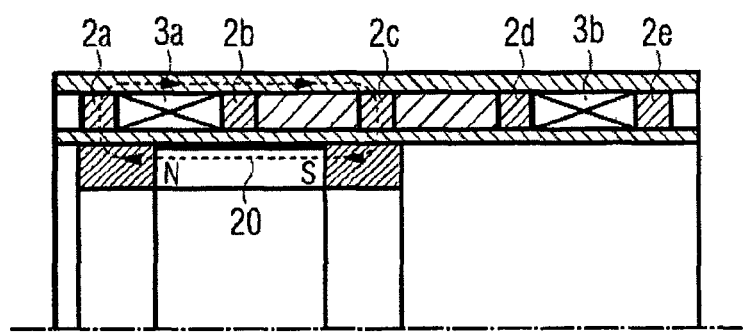
FIG. 7 shows the magnetic flux in a second position without energizing.

FIG. 7 shows the magnetic flux in a second position without energizing. Here the armature pole pieces 6a and 6b are located opposite the stator pole pieces 2a and 2c. In this position the magnetic resistance (reluctance) of the magnetic circuit is again very low. The magnetic field is closed from the north pole N via the armature pole piece 6a and the stator pole piece 2a via the magnetic guiding element 1 to the stator pole piece 2c and the armature pole piece 6b with the south pole S of the permanent magnet 7. The armature is also located in a stable equilibrium here.

Figure 8:
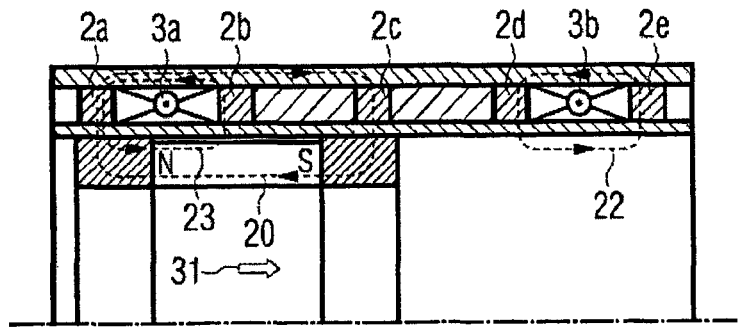
FIG. 8 shows the magnetic flux in a second position with energizing.

FIG. 8 shows the magnetic flux in a second position with energizing. The current pulse produces magnetic fields 23, 22 in the coils which act via the stator pole pieces and the armature pole pieces on the permanent magnets and are superposed on the magnetic field 20 of the permanent magnet. The current flows through the coil 3a out from the plane of the drawing here and produces a magnetic field 23, likewise current flows through the coil 3b out from the plane of the drawing and produces a magnetic field 22. The magnetic field 23 acts here in the opposite direction to the magnetic field 20, with the result that a repulsive force is achieved between the coil 3a and the permanent magnet. Therefore, a force and consequently an acceleration of the armature is produced to the right in the direction 31. The magnetic field of the coil 3a alone is sufficient to move the armature. Here however, only the coil 3b is energized in order with its magnetic field, to increase the stiffness in the central position S2, according to FIG. 5.

Figure 9:
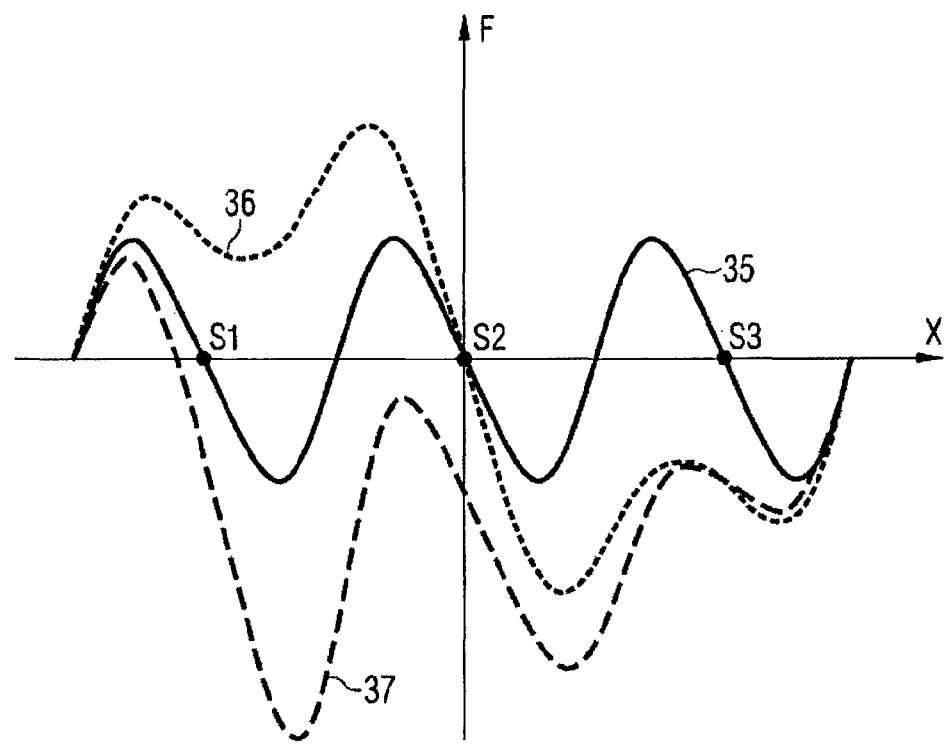
FIG. 9 shows force-distance characteristics of the stepper motor for different coil currents

FIG. 9 shows the force-distance characteristics of the stepper motor for various coil currents. Here, the force F exerted by the magnetic fields on the armature is plotted as a function of the deflection X of the armature. The characteristic 35 shows the non-energized state, that is at a coil current 0. At the points S1, S2 and S3 the force on the armature is 0. In the event of a positive deflection at one of these points, a negative restoring force is obtained which restores the armature back into the original position according to one of the points S1, S2 or S3. The same applies for a negative deflection. If the coils are now energized as shown in FIG. 6 in order to achieve a movement to the left, the force behavior according to curve 37 is obtained. Here a leftward acting negative force is exerted on the armature over a wide range. Equilibrium is established at that point at which the curve 37 intersects the X axis. The first equilibrium point is located somewhat to the left of the point S1. If the armature is now located at the point S2 before energizing, it will be moved by the negative force in the direction of the point S1. After switching off the current, the armature is displaced by the restoring force to the point S1 according to the characteristic 35. If energizing now takes place in accordance with FIG. 8, the characteristic 36 is obtained. Accordingly, a positive force is exerted on the armature at the point S1 for movement to the right until this occupies a stable equilibrium at point S2. After switching off the current, the equilibrium is preserved at this point (characteristic 36).

Figure 10:
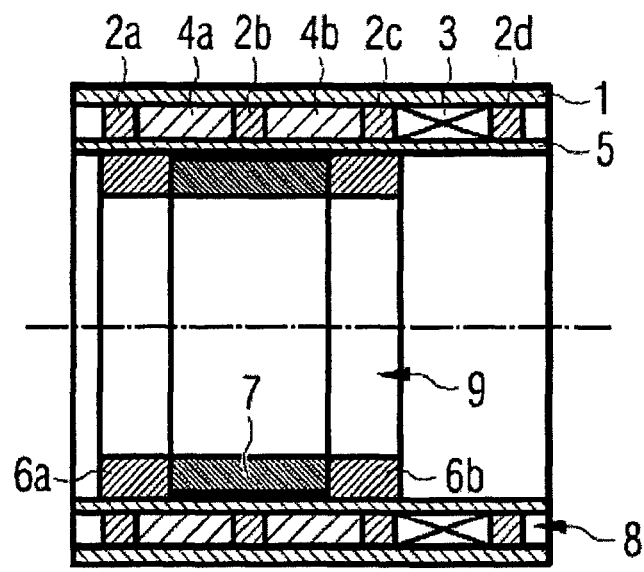
FIG. 10 shows a further stepper motor with two stable armature positions.

FIG. 10 show a further stepper motor having two stable armature positions. A single coil 3 is provided for the movement of the armature. Here the armature is shown in a first position to the left. By energizing the coil, it can be moved into a second position, as shown in FIG. 11.

Figure 11:
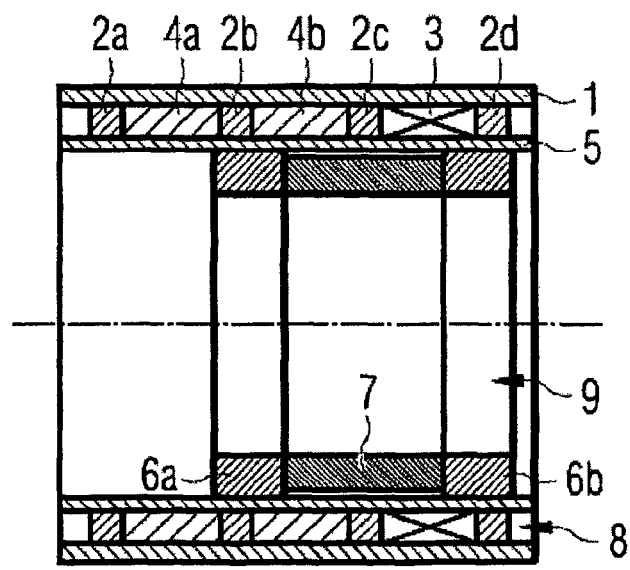
FIG. 11 shows the motor according to FIG. 10 with the armature in the second stable position.

FIG. 11 shows the stepping motor from FIG. 10 with the armature in the second stable position to the right.

Figure 12:
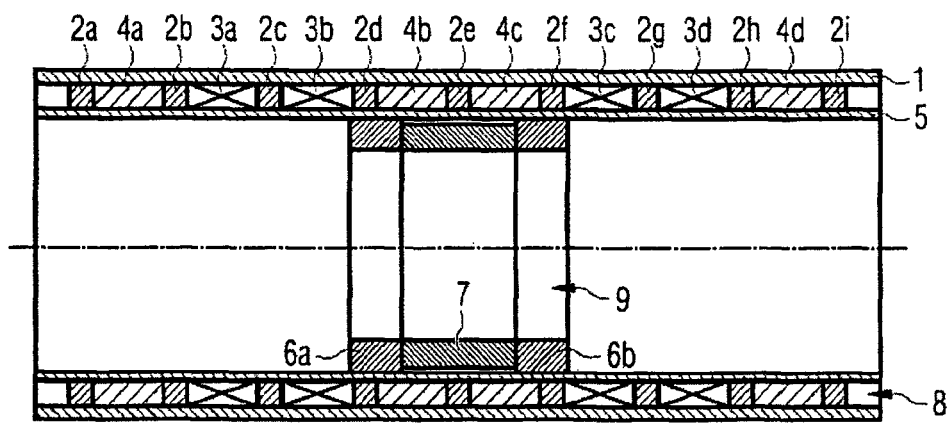
FIG. 12 shows a stepper motor with four coils.

FIG. 12 shows a further embodiment of a stepper motor with four coils 3a, 3b, 3c and 3d. Spacers 4a, 4b, 4c and 4d are furthermore provided. The armature is shown here in a first position. In principle, the armature can occupy seven different stable positions here. In order to be able to uniquely position the armature from any arbitrary position without detecting the actual position by measurement technology, it is expedient to initially execute a zero run. In this case, the coils of the stator are supplied with a sequence of current pulses in such a manner that the armature runs into a defined position (zero position). This is preferably an end position at the left or right end of the path. The advantage of this strategy is that the initial position of the armature need not be known. Following the zero run, the armature can be moved by means of the corresponding energizing configuration from the zero position into a desired setpoint position. For each position to be approached there is precisely one sequence of pulses, which simplifies the control. A maximum of six successive pulses are required with this method in order to position the armature in this example. Consequently, a unique positioning of the armature without checking the actual position is possible in a few milliseconds. This method can also be applied to any other stepper motor regardless of its number of positions.

Figure 13:
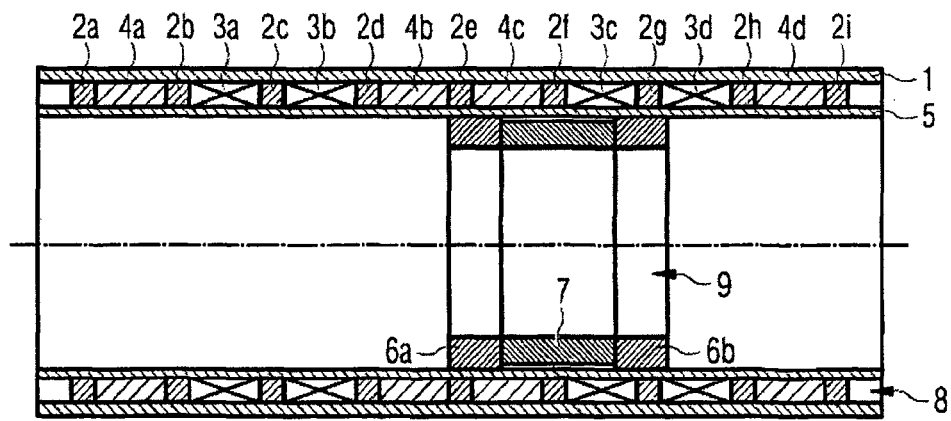
FIG. 13 shows the stepper motor according to FIG. 12 with a different armature position.

FIG. 13 shows the stepper motor from FIG. 12 with a different armature position to the right of the armature position from FIG. 12.

Figure 14:
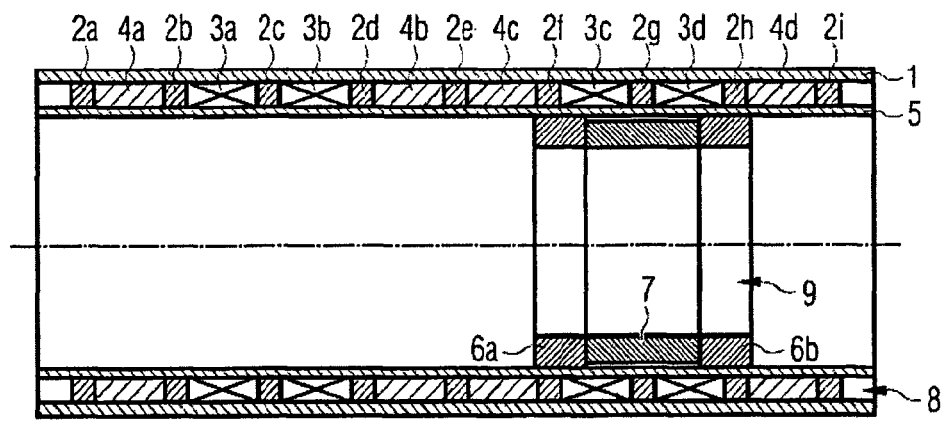
FIG. 14 shows the stepper motor according to FIG. 12 with a further armature position.

FIG. 14 shows the stepper motor from FIG. 13 with a different armature position to the right of the armature position from FIG. 13.

Figure 15:
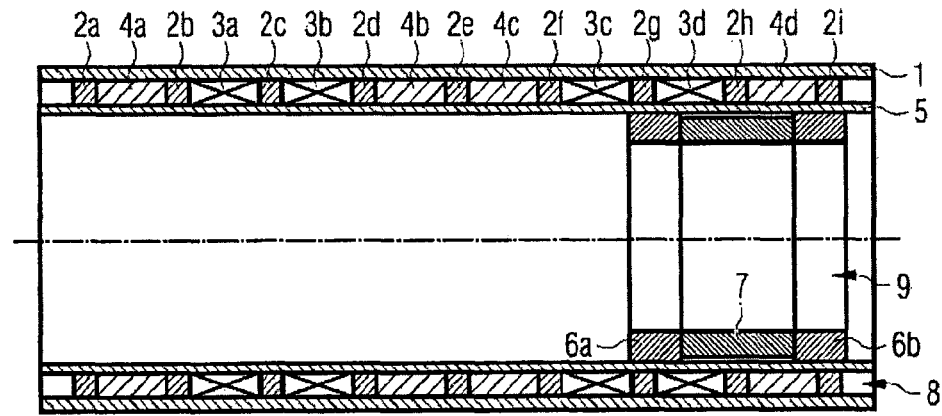
FIG. 15 shows the stepper motor according to FIG. 12 with a further armature position.

FIG. 15 shows the stepper motor from FIG. 14 with a different armature position to the right of the armature position from FIG. 14.

Figure 16:
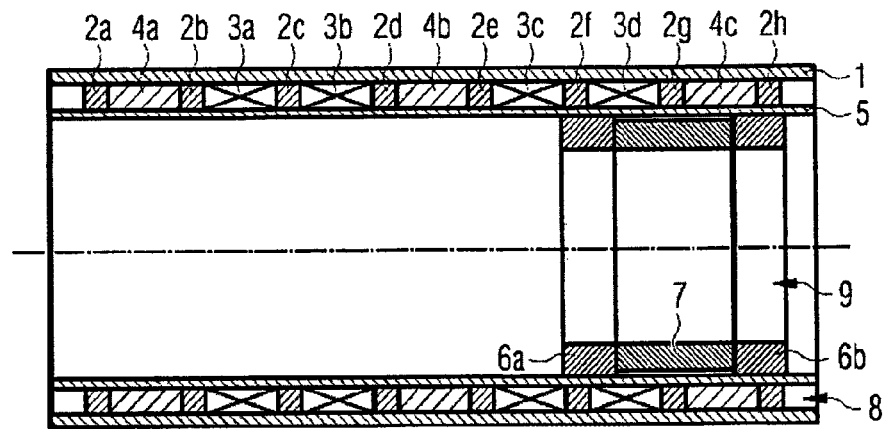
FIG. 16 shows a further stepper motor.

FIG. 16 shows a further stepper motor.

Figure 17:
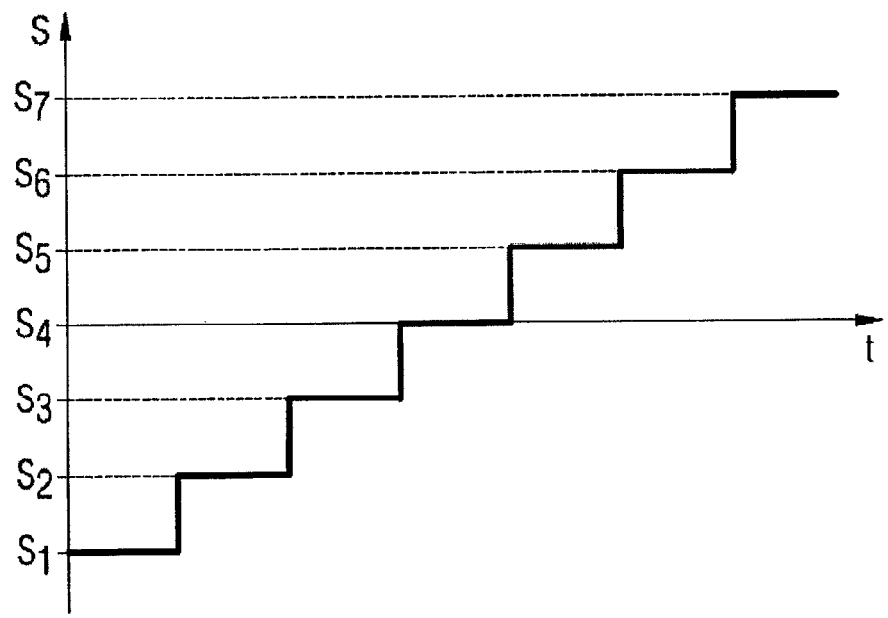
FIG. 17 shows an example the movement of a stepper motor according to one of FIGS. 12 to 15 as a function of time.

FIG. 17 shows as an example the movement of a stepper motor according to one of FIGS. 12 to 15 as a function of time. In this case, respectively one corresponding coil is energized in such a manner that the armature sequentially runs through the positions S1-S7.

It will be appreciated to those skilled in the art having the benefit of this disclosure that this invention is believed to provide linear stepper motors. Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A linear stepper motor for the displacement of an armature parallel to a stator having N steps, wherein
the stator includes at least (N+2) stator pole pieces which are enclosed by a magnetic guiding element and are each approximately the same distance from neighboring stator pole pieces, and at least one coil located between two stator pole pieces, and
the armature is completely enclosed by the stator in the radial direction and has at least one permanent magnet with an armature pole piece on each side, the permanent magnet being magnetized parallel to the stator.

2. The linear stepper motor according to claim 1, wherein 1, 2 or 3 stator pole pieces lie between two coils.

3. The linear stepper motor according to claim 1, wherein the distance between two armature pole pieces is greater than or equal to the distance between at least 2 stator pole pieces.

4. The linear stepper motor according to claim 3, wherein the distance between two armature pole pieces is greater than or equal to the distance between $Z \geq 2$ stator pole pieces plus the length of the stator pole piece in the axial direction.

5. The linear stepper motor according to claim 1, wherein as a result of the reluctance forces, the armature occupies stable idle positions in which preferably the stator pole pieces lie approximately opposite to the armature pole pieces.

6. The linear stepper motor according to claim 1, wherein an optical element can be accommodated within the armature.

7. The linear stepper motor according to claim 1, wherein the armature is rotationally symmetrical.

8. The linear stepper motor according to claim 1, wherein the stator is rotationally symmetrical.

9. The linear stepper motor according to claim 1, wherein a sliding sleeve including a non-ferromagnetic material having a low coefficient of friction on the surface is disposed between the stator and the armature.

10. The linear stepper motor according to claim 1, wherein the armature consists of solid material and merely has a plunger for the positioning of instruments.

11. The linear stepper motor according to claim 1, wherein at least one further armature is provided which can be moved independently of the first armature.

12. The linear stepper motor according to claim 1, wherein a very small alternating current having frequencies up to a maximum of 1 kHz is superposed on a direct current through a coil to reduce the static and sliding friction.

13. A method for operating a linear stepper motor according to claim 1, comprising switching on the stepper motor, and thereafter performing a calibration in which the armature is displaced to a defined position.

14. The method of claim 13, wherein the defined position is an end position.

* * * * *